L. P. BERRY, Jr.
APPARATUS FOR SEWAGE DISPOSAL.
APPLICATION FILED NOV. 16, 1918.
1,337,431. Patented Apr. 20, 1920.
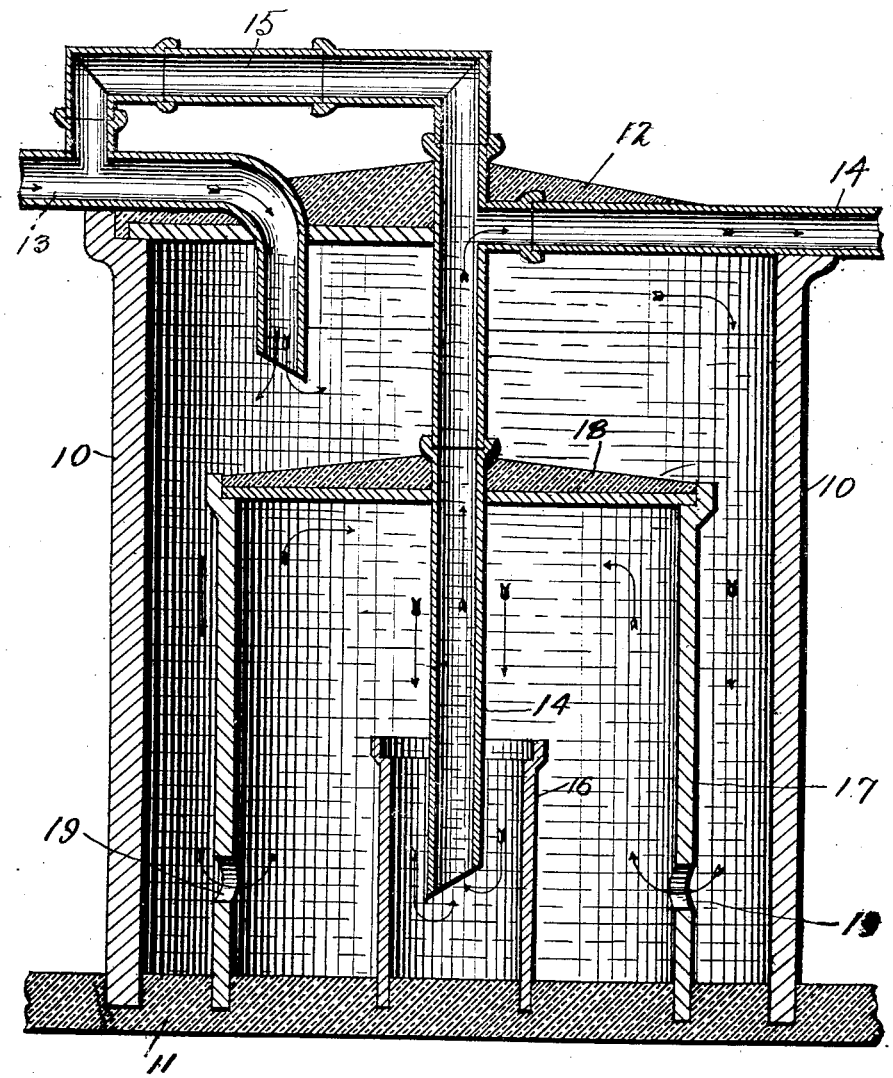

UNITED STATES PATENT OFFICE.

LOUIS PERKINS BERRY, JR., OF MARION, ARKANSAS.

APPARATUS FOR SEWAGE DISPOSAL.

1,337,431.  Specification of Letters Patent.  Patented Apr. 20, 1920.

Application filed November 16, 1918. Serial No. 262,806.

*To all whom it may concern:*

Be it known that I, LOUIS PERKINS BERRY, Jr., resident of Marion, in the county of Crittenden, and in the State of Arkansas, have invented a certain new and useful Improvement in Apparatus for Sewage Disposal, and do hereby declare that the following is a full, clear, and exact description thereof.

My invention relates to sewage disposal, and my object is to provide an apparatus for the treatment of sewage, which will be of high efficiency, economical to install and maintain, and adaptable most advantageously, to local, or individual use, in contradistinction to municipal, or large-scale plants, and to such end my invention consists in the apparatus for sewage disposal, substantially as hereinafter specified and claimed.

In the annexed drawings, which form a part of this specification; the figure is a vertical section of apparatus constructed and operating in accordance with my invention, and illustrates an embodiment thereof for local use.

My apparatus is so constructed as to utilize most advantageously the activities of aerobic and anaerobic bacteria, by producing, in succession, the conditions favorable to the aerobic bacteria, which require oxygen, and conditions favorable to anaerobic bacteria, which involve absence of oxygen.

At some point conveniently selected to utilize gravity to secure the flow of sewage from the house or building, I install a tank. 10, which I prefer to construct of a joint or section of pipe of vitreous material standing on end and embedded in and closed by a base 11 of cement, and having its upper end closed hermetically by a cement top or cover 12, so that except for the inlet and outlet pipes hereinafter described, it is completely closed.

The inlet pipe, or intake, 13, enters the tank through a tightly sealed hole in the top, 12, its open lower end being a short distance below the top, and just below the normal water level that is maintained in the tank by a laterally extending outlet pipe, 14, that passes outward through the side wall of the tank 10, and has its discharge end carried to some remote point, for the final discharge of the sewage water after the same has been purified by the treatment given in the tank as hereinafter explained. The outlet pipe extends substantially horizontally within the tank 10, and at or near the center thereof is carried downward nearly to the tank bottom, where its open end receives the liquid or water which thus flows upward through the pipe until it reaches the level of the horizontal portion of the pipe and then passes out through the latter. To guard against siphoning off of the contents of the tank 10, which, of course, would happen if the discharge end of the outlet pipe be situated at a level lower than its inlet end in the tank, I provide for the introduction of air into the outlet pipe 14, which will break or prevent siphoning. I do this by a pipe 15 that leads from the top of intake pipe, just beyond where the latter passes through the tank cover 12, and enters the outlet pipe at the top, in the joint between its horizontal and vertical portions. Thus air at all times may enter the outlet pipe above the normal water level, and through a closed and guarded passage, so that, whether completely buried in the earth, or with the upper part of the tank or pipes on the outside thereof, above the top, exposed, there can be no clogging of the outlet pipe, either by matter accidentally falling therein, or mischievously placed, or thrown therein.

The lower inlet end of the outlet pipe 14, is surrounded by a curb or wall 16, preferably a joint or section of vitreous pipe stood on end and embedded in the cement base 11, and reaching well above the open lower end of said pipe 14.

Within the tank 10, is a chamber 17, also preferably of a joint or section of vitrified pipe embedded at its bottom in the cement base 11, and hermetically closed at its upper end by a cement top or cover 18, which chamber is in communication with the tank 10 only by several holes 19 near the bottom, and, though the vertical part of the outlet pipe 14, passes through the cover 18, the joint is hermetically closed so that as the top of the inner chamber 17 is below the horizontal portion of the outlet pipe 14, and thus below the normal water level in the tank, and access of air or oxygen (except such as is in the water) to the interior of the chamber 16 is prevented.

Enough oxygen enters with the water into the tank 10 to assure action by aerobic bacteria on the sewage, and that action is followed by the activities of the anaerobic bacteria in chamber 17, for therein exist the conditions as to oxygen favorable to them, and which are unfavorable to aerobic bacteria.

It will be seen that the liquid sewage will flow into the lower end of the chamber 17, and rise therein to the top and then descend at the center, and enter within the curb 16, and by the time it reaches the lower end of the outlet pipe, it will be purified and thus ready to be discharged at the selected place, exterior to the tank 10.

By the use of joints or sections of vitrified pipe, for tanks or containers, I attain the important requisites of economical and efficacious construction.

Of course, my invention may be embodied in apparatus differently constructed.

What I claim is:—

1. The combination of a tank having a sewage inlet and a water outlet, and a chamber within such tank having a closed top below the normal liquid level maintained by such outlet, said chamber communicating with the tank at or near its bottom, and also communicating with said outlet.

2. The combination of a tank having a sewage inlet and a water outlet, and a chamber within such tank having a closed top below the normal liquid level maintained by such outlet, said chamber communicating with the tank at or near its bottom, and also communicating with said outlet near its bottom, and a curb in the chamber around and above the place of communication of the chamber and outlet.

3. The combination of a sewage receiving tank, a sewage inlet pipe, an outlet pipe, and means to prevent siphoning of the tank contents comprising a normally open air pipe connecting the inlet pipe and the outlet, and providing a flow of air from inlet to outlet pipe when flow occurs through the tank to the outlet, said air pipe opening into the top of said outlet pipe.

In testimony that I claim the foregoing I have hereunto set my hand this 2nd day of November, 1918.

LOUIS PERKINS BERRY, Jr.